(No Model.)

J. C. TALIAFERRO.
MACHINE FOR CUTTING AND POINTING RODS OF METAL.

No. 352,961. Patented Nov. 23, 1886.

WITNESSES
Edwin A. Newman
Christian M. Newman

INVENTOR
J. C. Taliaferro
By his Attorneys
Baldwin, Hopkins & Payton

UNITED STATES PATENT OFFICE.

JOHN C. TALIAFERRO, OF RICHMOND, VIRGINIA.

MACHINE FOR CUTTING AND POINTING RODS OF METAL.

SPECIFICATION forming part of Letters Patent No. 352,961, dated November 23, 1886.

Application filed September 7, 1886. Serial No. 212,896. (No model.)

*To all whom it may concern:*

Be it known that I, JOHN C. TALIAFERRO, of Richmond, in the county of Henrico and State of Virginia, have invented certain new and useful Improvements in Machines for Cutting and Pointing Bars of Metal, of which the following is a specification.

My object mainly is to provide simple and inexpensive mechanism by which to expeditiously sever and point round bars of iron; and, further, my object is to brand the bars at the time of severing and pointing them.

To these ends my improvements consist in a novel organization of devices hereinafter in detail described, and the subject-matter deemed novel then specifically claimed.

Figure 1:
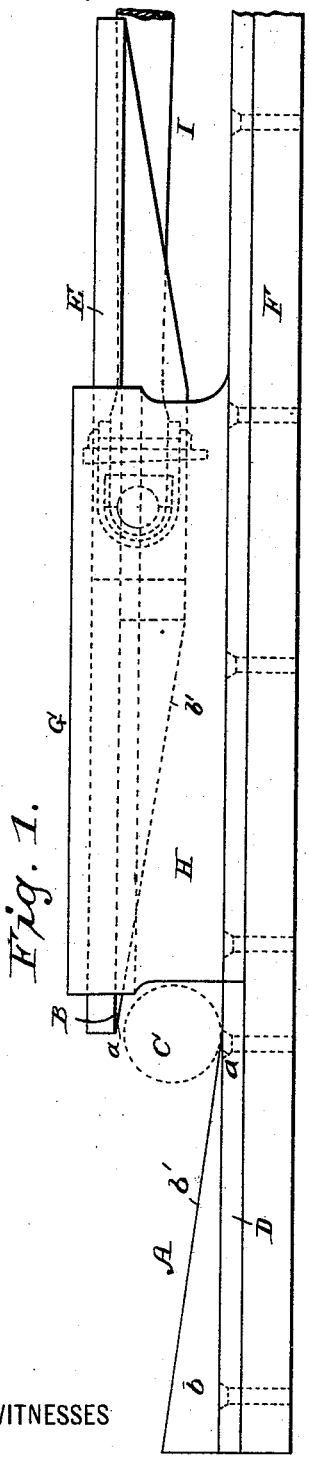
Figure 2:
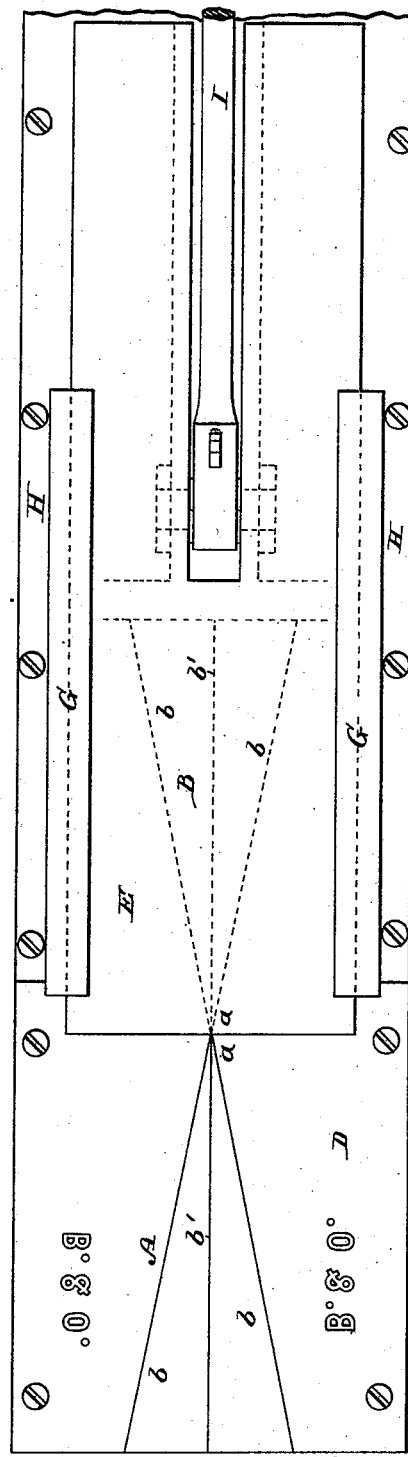
Figure 3:
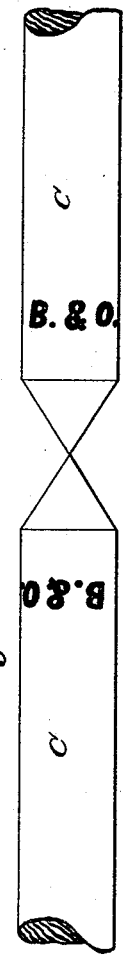

In the accompanying drawings, Figures 1 and 2 show, respectively, a side elevation and a plan view of so much of the mechanism as is needed to convey a proper understanding of my invention; and Fig. 3 shows portions of two bars with their pointed ends as produced in accordance with my invention.

As in this instance shown, the apparatus is particularly designed for use in the manufacture of the ordinary wrought-iron car-coupling pins; but obviously my improvements may advantageously be employed for cutting and pointing bars of steel, &c., and bars any of desired diameters and lengths—such, for instance, as commonly used in the construction of wrought-iron fences and for various other purposes.

Two similarly formed, pointed, and longitudinally and transversely inclined cutters, A and B, are provided, and between them the properly-heated round bar C, of iron, is placed, so that by the movement of one of the cutters over the other (if preferred, both cutters may be given motion) the bar will be turned and gradually cut through, and at the same time pointed on both sides of the central line of the cut, forming at one operation the two pointed bars, Fig. 3. As shown, the cutter A is stationary and the cutter B reciprocates. The cutters point in opposite directions, and are so arranged that when inoperative their points *a a* are in or nearly in the same vertical plane, with a sufficient space between them to admit of the placing of a bar, C, in position. The cutters are doubly inclined transversely, the similar side inclines, *b b*, extending from the bases of the cutters to the central longitudinal ridges or peaks, *b'*, of the longitudinal inclines of the respective cutters. The cutters are made of suitable metal—cast-steel, for instance—and are preferably formed integral with their respective securing-plates D E. The cutter A is detachably secured by its securing-plate, as by screws or bolts, to a suitable frame, F, and the reciprocating cutter B is supported by its securing-plate in guideways G G, formed in strong brackets H H of the frame. The securing-plate E of the reciprocating cutter is extended and longitudinally and centrally slotted to receive and have jointed to it a connecting-rod, I, by which motion is imparted to the cutter in suitable way, as by a power-rotated crank-shaft, as will readily be understood.

With the cutters facing in opposite directions or toward each other—the one facing upward and the other downward—as shown, and with the length of stroke of the connecting-rod properly regulated, it will be seen that when the hot bar of iron is placed in position and the movable cutter advanced the bar will be turned or rolled and gradually severed and simultaneously pointed, the operation being completed at the end of the outstroke of the reciprocating cutter, which occurs at a time such as to prevent contact of the cutters with each other. In this way bars, each of a length to form two car-coupling pins, fence-rods, rake-teeth, &c., may be severed and pointed midway their length in rapid succession.

In order to mark the bars with suitable brands as they are being cut and pointed, the steel securing-plate of one of the cutters, preferably the plate of the cutter A, is provided at opposite sides of the cutter with raised letters, such as B and O, or other marks, as desired, so that as the hot bar is rolled over the plate it will be impressed with the mark. Thus by a single and rapid operation a bar is converted into two pointed and branded bars.

Although I have shown the cutters so arranged as to reciprocate the one above the other [horizontally, and prefer this arrangement, it is obvious that the apparatus may be arranged in an upright or inclined position without departure from my invention, provided the positions of the cutters relatively to each other are not altered so as to interfere with the operation above described resulting from the rectilinear reciprocation of one or both of the cutters.

I claim as of my own invention—

1. The combination of the frame, the pointed cutter A, inclined longitudinally and doubly inclined transversely, and the similarly-formed reciprocating cutter B, between which cutters the bar is operated upon to simultaneously sever it into two bars with pointed ends, substantially as and for the purpose set forth.

2. The combination of the frame, the pointed cutter A, inclined longitudinally and doubly inclined transversely, and having the securing-plate with the branding-marks upon it, the cutter B, pointed and inclined correspondingly with the cutter A, and having the securing-plate, the guideways, and the connecting-rod, substantially as and for the purpose set forth.

In testimony whereof I have hereunto subscribed my name.

JOHN C. TALIAFERRO.

Witnesses:
R. G. HENDRIE,
H. K. FRANKLIN.